FULL ADDER

Filed Dec. 29, 1959 2 Sheets-Sheet 1

INVENTOR
GERALD A. MALEY

BY MITCHELL & BECHERT

ATTORNEYS

June 23, 1964 G. A. MALEY 3,138,703

FULL ADDER

Filed Dec. 29, 1959 2 Sheets-Sheet 2

United States Patent Office 3,138,703
Patented June 23, 1964

3,138,703
FULL ADDER

Gerald A. Maley, Poughkeepsie, N.Y., assignor to International Business Machines Corporation, New York, N.Y., a corporation of New York Filed Dec. 29, 1959, Ser. No. 862,677
11 Claims. (Cl. 235—175)

The present invention relates to electronic circuits for performing binary-digital computations, and more particularly to new and improved synchronous and asynchronous full adder circuit arrangements.

In the process of adding two binary digital numbers, the numbers to be added are considered digit by digit, beginning with the least significant digits, and a separate addition operation is performed upon each pair of corresponding digits, which operation further involves a carry digit derived from previous operations upon less significant digits. Thus, each addition operation involves an augend A and an addend B from the numbers to be added, and a carry digit $C_I$ derived from the preceding operation. From these three digits, the operation provides a resultant R, and a carry digit $C_0$ which becomes the carry digit $C_I$ for the next step in the process.

In computer devices, each such addition operation is performed in a full adder cell. A full adder cell may be defined, therefore, as a circuit arrangement which is capable of absorbing all possible combinations of the inputs A, B and $C_I$ and of producing therefrom the correct resultant R and the correct carry digit $C_0$. Since only the digits "0" and "1" are employed in a binary system, the operation of a full adder cell for all possible input combinations may be summarized as in Table 1.

*Table 1*

| Combination | A | B | $C_I$ | R | $C_0$ |
|---|---|---|---|---|---|
| 1 | 0 | 0 | 0 | 0 | 0 |
| 2 | 1 | 0 | 0 | 1 | 0 |
| 3 | 0 | 1 | 0 | 1 | 0 |
| 4 | 0 | 0 | 1 | 1 | 0 |
| 5 | 1 | 1 | 0 | 0 | 1 |
| 6 | 1 | 0 | 1 | 0 | 1 |
| 7 | 0 | 1 | 1 | 0 | 1 |
| 8 | 1 | 1 | 1 | 1 | 1 |

It is an object of the present invention to provide new and improved full adder cell circuit arrangements.

It is a further object of the invention to provide such circuit arrangements which need only be formed of circuit blocks capable of performing the logical operations of AND and OR as defined below.

The logical operation AND is performed by a circuit which has two (or more) inputs and is so designed that an output signal is produced when, and only when, input signals are received on both (or all) input leads. Such circuits are variously known as gates, coincidence circuits, Rossi circuits, or logic AND circuits.

The logical operation OR is performed by a circuit which has two (or more) inputs and is so designated that an output signal is produced when an input signal is received on at least one of its input leads. Such circuits are variously known as buffers, isolating circuits, anti-Rossi circuits, or logic OR circuits.

Full adder cells may be either synchronous or asynchronous in operation. In a synchronous adder, means, such as a timing circuit, are provided so that the cell may operate under the assumption that all of the requisite input signals will be simultaneously applied at the time that the addition operation is to be performed. An asynchronous adder may make no such assumption. It must, therefore, be provided with information relative to the availability of the input signals required for the addition operation.

It is another object of the present invention to provide new and improved full adder cell circuit arrangements which may readily be adapted for both synchronous and asynchronous operation.

An apparatus illustrating certain aspects of the invention may comprise a first set of three input terminals for receiving, respectively, input signals representative of an addend, an augend and a previous carry digit, a second set of three input terminals for receiving respectively, input signals representative of the complement of the addend, augend and carry digit, first, second, and third logic AND circuit blocks of the two-input type, a resultant output terminal, and a carry output terminal, two of the first set of input terminals being connected to the first OR circuit block, the third input terminal of the first set being connected to the fourth OR circuit block, two of the second set of input terminals being connected to the second OR circuit block, the third input terminal of the second set being connected to the third OR circuit block, the outputs of the first and second OR circuit blocks being connected to the first AND circuit block, a true output of the first AND circuit block being connected to the fourth OR circuit block and a complement output of the first AND circuit block being connected to the third OR circuit block, the outputs of the third and fourth OR circuit blocks being connected to the second AND circuit block, the outputs of the second and third OR circuit blocks being connected to the third AND circuit block, the resultant output terminal being connected to the second AND circuit block, and a complement output of the third AND circuit block being connected to the carry output terminal.

A complete understanding of the invention may be obtained from the following detailed description of means forming specific embodiments thereof, when read in conjunction with the appended drawings, in which.

Figure 1:
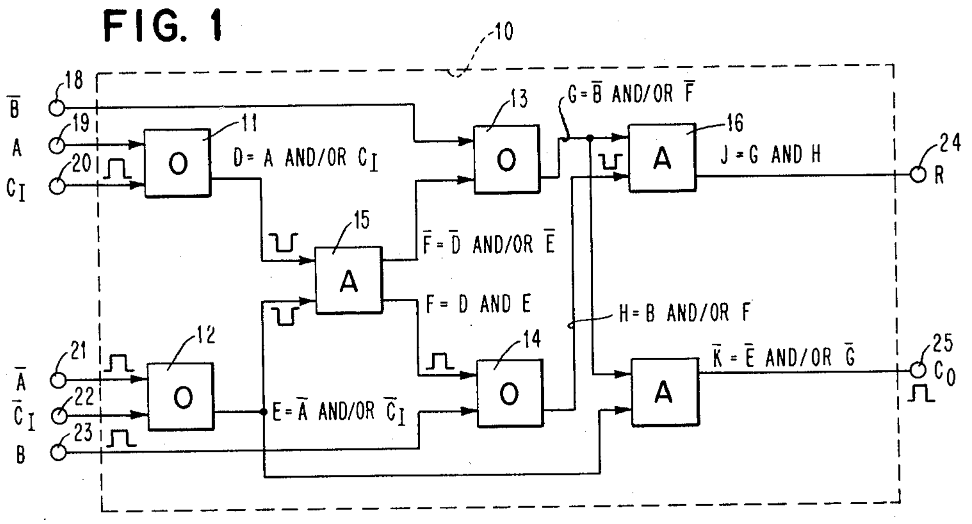
FIG. 1 is a logical block diagram of a synchronous full adder cell circuit arrangement in accordance with the invention.

Referring to FIG. 1, the full adder cell circuit arrangement 10 illustrated therein may be functionally divided into four logic OR circuit blocks 11, 12, 13 and 14 and three logic AND circuit blocks 15, 16 and 17. All of the OR logic blocks are of the direct output type; i.e. they produce a binary "1" output signal in response to a binary "1" input on either of their two input terminals. AND circuit 16 is also of the direct output type, but AND circuit 17 is of the inverted output type, i.e. it produces a binary "1" output in response to binary "0" input signals on both of its input terminals and a binary "0" output signal in response to a binary "1" on either of its two input terminals. AND gate 15 has two output signals; a direct or true output F and an inverted or complement output $\overline{F}$. Many suitable circuits for embodying these logical blocks are well known to those skilled in the art, and any suitable circuit can be used in connection with this invention. It will be noted that six separate input terminals 18, 19, 20, 21, 22 and 23 lead into the adder cell. Three of these input terminals 19, 20, 23, are connected so as to be responsive to signals representative of the digits A, B and $C_I$ listed in Table 1. The remaining three input terminals 18, 21 and 22 are connected so as to be responsive to signals representative of the complements $\overline{A}$, $\overline{B}$ and $\overline{C}_I$ of the A, B and $C_I$ digits. In a binary system, the complement of the digit "1" is the digit "0" and vice versa, the non-complementary digit being referred to as the "true" digit. Therefore, the input terminals connected to the adder cell 10 may be divided into two sets, a true input set and a complementary input set. Two separate output terminals 24 and 25 lead out of the adder cell 10. Output terminal 24 is connected to provide an output signal indicative of the resultant R, while output terminal 25 is connected to provide an output signal indicative of the carry digit $C_0$.

Two of the input terminals 19 and 20, from the true input set are connected to the OR circuit 11. Two of the input terminals 21 and 22, from the complementary set are connected to the OR circuit 12. The remaining true input terminal 23 is connected to the OR circuit 14 while the remaining complementary input terminal 18 is connected to the OR circuit 13. In the particular arrangement illustrated, terminals 19, 20 and 23 are made responsive to input signals representative of the true digits A, $C_I$ and B, respectively, while terminals 18, 21 and 22 are made responsive to input signals representative of the complementary digits $\overline{B}$, $\overline{A}$ and $\overline{C}_I$, respectively. However, since the binary addition operation depends equally upon all three of the true digits, the input signals representative thereof may be interchangeably applied to the terminals of the true input set. The same interchangeably is permissible with respect to the signals and the terminals of the complementary input set.

With the inputs shown, OR circuit 11 will produce an output signal D if an input signal A and/or an input signal $C_I$ is applied to its input terminals. Similarly, OR circuit 12 will produce an output signal E if an input signal $\overline{A}$ and/or an input signal $\overline{C}_I$ is applied to its input terminals. The outputs of OR circuit 11 and of OR circuit 12 are both applied to two-input AND circuit 15. Thus, AND circuit 15 will produce a true output F only when both of the signals D and E are applied thereto. This output of AND circuit 15 is applied to OR circuit 14. In addition, AND circuit 15 is adapted to produce a complement output signal $\overline{F}$ which is the opposite of the true output signal F. Output signal $\overline{F}$, therefore, results when the signal D and/or the signal E is not applied to the AND circuit 15. This output of AND circuit 15 is applied to OR circuit 13.

The OR circuit 13, therefore, will produce an output signal G if an input signal $\overline{B}$ and/or the signal $\overline{F}$ is applied thereto. The OR circuit 14, on the other hand, will produce an output signal H if an input signal B and/or the signal F is applied thereto. The outputs of OR circuit 13 and of OR circuit 14 are both applied to two-input AND circuit 16. Thus, AND circuit 16 will produce an output signal J only when both of the signals G and H are applied thereto. On the other hand, the outputs of OR circuit 12 and of OR circuit 13 are both applied to two-input AND circuit 17. Thus, AND circuit 17 will produce a true output signal K only when both of the signals E and G are applied thereto. The AND circuit 17, however, is adapted to produce a complement output signal $\overline{K}$ which is the opposite of the true output signal K. Output signal $\overline{K}$, therefore, results when neither the signal E nor the signal G is applied to the AND circuit 17.

The sequence of logical operations performed by the circuit of FIG. 1 is such that the true output signal J of AND circuit 16 is representative of the resultant digit R, while the complement output signal $\overline{K}$ of AND circuit 17 is representative of the carry digit $C_0$. Accordingly, the true output of AND circuit 16 is connected to terminal 24 and the complement output of AND circuit 17 is connected to terminal 25. The application of input signals to adder cell 10 representative of any one of the combinations of Table 1 should, therefore, produce output signals representative of the appropriate digits R and $C_0$ at the output terminals 24 and 25, respectively.

The manner in which this is effectuated will be illustrated by selecting combination 7 in Table 1, by way of example, and tracing through the logical operations performed on such combination by the adder cell 10. In combination 7, the addend B is equal to "1," the augend A is equal to "0," and the previous carry digit $C_I$ is equal to "1." Normally, in binary-digital computer systems, the digit "1" is arbitrarily represented by an input signal, while the digit "0" is represented by the absence of an input signal. In that event, input signals will be applied to terminals 20 and 23 of the true input set and to terminal 21 of the complement input set. Each of the OR circuits 11 and 12 thus has an input signal applied to one of its terminals. This satisfies the conditions required for the production of the output signals D and E. Accordingly, signals are applied to both inputs of the AND circuit 15. This, in turn, satisfies the conditions for the production of the true output signal F by AND circuit 15. Accordingly, a signal from AND circuit 15 is applied to OR circuit 14. On the other hand, of course, the conditions for the production of the complement signal $\overline{F}$ are not satisfied and no signal from AND circuit 15 is applied to OR circuit 13.

Considering OR circuit 13, it will be noted that it receives neither an input signal from terminal 18 nor a signal from AND circuit 15. Therefore, the conditions for the production of the signal G are not satisfied. Conversely, it will be noted that OR circuit 14 receives an input signal from terminal 23 and a signal from AND circuit 15, either one satisfying the conditions for the production of the signal H. This results in the application of only one signal to the two input AND circuit 16. Accordingly, the conditions for the production of the signal J are not satisfied and an output signal does not appear at terminal 24. Referring now to AND circuit 17, it will be noted that though OR circuit 12 provides a signal, OR circuit 13 does not. Thus, the conditions for the production of a true output signal K from AND circuit 17 are not satisfied. Accordingly, the conditions for the production of the complement signal $\overline{K}$ are satisfield and an output signal appears at terminal 25.

In summation, the application of input signals representative of the combination 7 in Table 1, produces an output signal at terminal 25 but no output signal at terminal 24. Following the arbitrarily selected system of digit representation, this means that the adder cell 10 has produced an answer of "0" for the resultant R and "1" for the carry digit $C_0$. This agrees with the R and $C_0$ listings in Table 1 for the combination 7. The same procedure may be followed to check out the operation of the adder cell for each of the other seven combinations in Table 1.

Thus, it has been shown that the present invention provides a full adder cell circuit arrangement which need only comprise logic AND and logic OR circuit blocks. The implementation of this circuit arrangement may be effected by design techniques well known to the art. For example, each logic block of the adder cell 10 may be implemented by a standard diode or transistor logic circuit. For that reason, and because of the wide variety of choices available to the designer, a circuit diagram is not included in this disclosure. It should be noted, however, that the simplicity of the circuit arrangement provided by the invention permits the design of an inexpensive and compact full adder cell wherein a relatively small number of circuit elements is required.

The circuit arrangement provided by the present invention has a further advantage which derives from the fact that the adder cell 10 provides an output as the result of four successive steps in time. The first step in time is performed by the OR circuits 11 and 12, the second by the AND circuit 15, the third by the OR circuits 13 and 14, and the fourth by the AND circuits 16 and 17.

The circuit arrangement of FIG. 1 comprises a synchronous full adder cell. However, in accordance with the invention, the full adder cell may very simply be adapted for asynchronous operation by the addition of four logic circuit blocks. Again, the logic blocks need only be of the OR and AND type.

Figure 2:
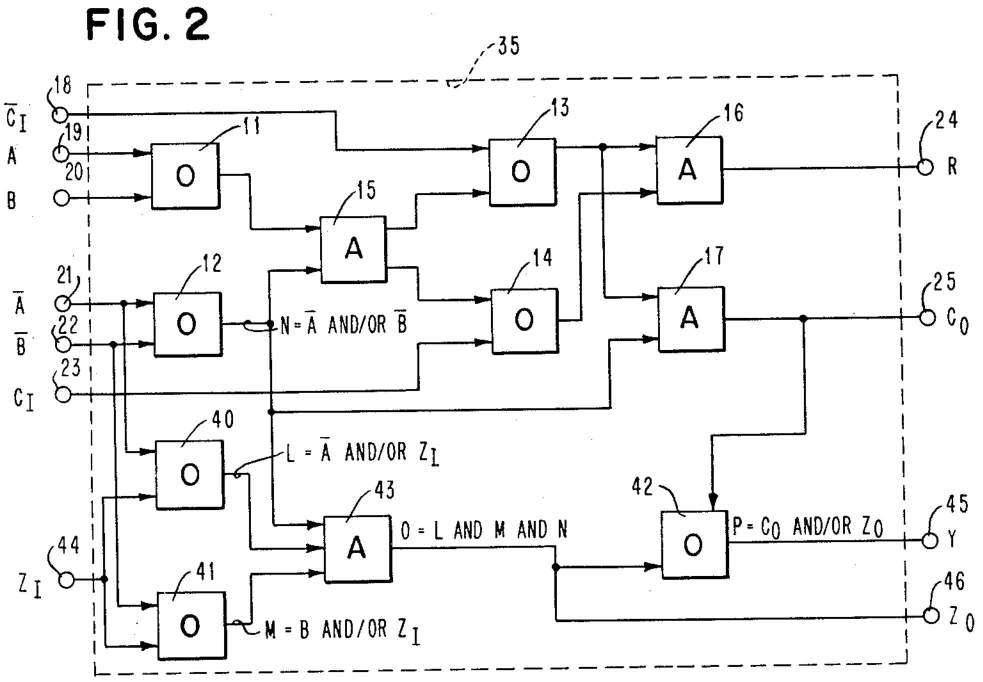
FIG. 2 is a logical block diagram of an asynchronous full adder cell circuit arrangement in accordance with the invention.

A circuit arrangement 35 whereby asynchronous operation may be effected is shown in FIG. 2. Logic circuit blocks identical to those utilized in the synchronous adder of FIG. 1 are similarly numbered, as are the terminals attached thereto. Thus, it will be seen that the asynchronous adder again utilizes the four logic OR blocks 11, 12, 13 and 14, and the three logic AND blocks 15, 16 and 17 connected together as in FIG. 1. Furthermore input terminals 18–23, and output terminals 24 and 25 are also connected as in FIG. 1. In this embodiment, however, input signals representative of the digits A, B and $C_I$ are applied to terminals 19, 20 and 23 respectively, while input signals representative of the complements $\overline{A}$, $\overline{B}$ and $\overline{C}_I$ are applied to terminals 21, 22 and 18 respectively. Though such connection differs from that shown in FIG. 1, the principle of applying true input signals to the true input terminals 19, 20 and 23, and complementary input signals to the complementary input terminals 18, 21 and 22 is adhered to.

The operation of the asynchronous adder depends upon the application of an additional input to the adder cell and the provision of two additional outputs therefrom. The additonal input is denoted $Z_I$ and is derived from a preceding adder cell. The additional outputs are denoted Y and $Z_0$. The output $Z_0$ becomes the input $Z_I$ for a succeeding cell and in that way operates as does the carry digit.

Figure 3:
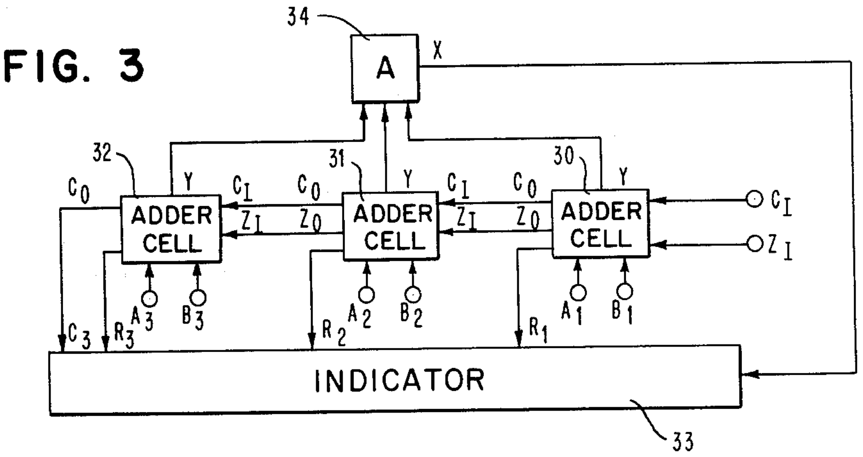
FIG. 3 is a block diagram of a computer unit adapted for asynchronous operation by the utilization of full adder cells of the type illustrated in FIG. 2.

A computer unit illustrating the utilization of the input $Z_I$ and the outputs Y and $Z_0$ is shown in FIG. 3. The computer unit is adapted to add two, three digit binary numbers. The first binary number comprises the digits $A_3$, $A_2$, $A_1$ in descending order of significance, and the second binary number comprises the digits $B_3$, $B_2$, $B_1$ in descending order of significance. Accordingly, the computer unit comprises three full adder cells 30, 31 and 32 connected in tandem. Since the output of cell 30 is fed into cell 31 and the output of cell 31 is fed into cell 32, the least significant digits $A_1$ and $B_1$ are applied to cell 30, the next highest significant digits $A_2$ and $B_2$ are applied to cell 31, and the highest significant digits $A_3$ and $B_3$ are applied to cell 32. In operation, the carry digit $C_0$ resulting from the addition operation in each cell is applied down the line to a succeeding cell as shown. The resultant R from each of the adder cells and the last carry digit $C_3$ are then applied to an external indicator 33 as indicative of the sum of the two binary numbers.

If each adder cell were synchronous in nature, no further inputs or outputs, other than those derived from normal timing circuitry, would be required. The additional inputs and outputs provided by the present invention adapt the computer unit for asynchronous operation. To this end, they are utilized to produce a signal X which indicates when all the adder cells of the computer unit have received all the input information required to produce the correct resultant and carry digits. As shown in FIG. 3, the signal X is derived from a three-input logic AND circuit block 34, the inputs to AND circuit 34 being the Y outputs of adder cells 30, 31 and 32. This means that the signal X is produced only when all three adder cells of the computer unit provide a Y output signal. Each adder cell, in turn, is adapted to provide a Y output signal only when it has received all the input digits required for it to produce the correct resultant and carry digits. The X output may be utilized, for example, to signal the occurrence of a correct reading in indicator unit 33.

The production of a carry digit output signal $C_0$ provides a cell with the information that it has the requisite inputs for the correct performance of its arithmetic operation. However, the production of a carry digit output signal occurs only for specific input digit combinations and not for others (Table 1). Thus, the carry output $C_0$ alone is not sufficient to provide an adder cell with the information required for the production of the signal Y. Accordingly, the invention provides the additional input $Z_I$, each adder cell being adapted to produce an output signal $Z_0$ whenever a carry signal is not progressing down the line or, in other words, is not to be expected. Thus, the outputs $Z_0$ and $C_0$ together provide each adder cell with sufficient information to determine whether or not a signal Y should be produced. The production of an X signal by AND circuit 34, therefore, indictates that all of the adder cells have received the requisite input information to perform their respective arithmetic operations. The X output may then be utilized, for example, to signal the occurrence of a correct reading in indicator unit 33.

The means by which the adder cell of FIG. 2 produces a Y output may best be described with reference to Table 2. Table 2 summarizes the operation of the adder cell in terms of the output signals produced by each possible input combination.

In view of the additional input $Z_I$, sixteen possible input combinations now exist.

*Table 2*

| Combination | A | B | $C_1$ | $Z_1$ | R | $C_0$ | $Z_0$ | Y |
|---|---|---|---|---|---|---|---|---|
| 1 | 0 | 0 | 0 | 0 | 0 | 0 | 1 | 1 |
| 2 | 1 | 0 | 0 | 0 | 1 | 0 | 0 | 0 |
| 3 | 0 | 1 | 0 | 0 | 1 | 0 | 0 | 0 |
| 4 | 0 | 0 | 1 | 0 | 1 | 0 | 1 | 1 |
| 5 | 1 | 1 | 0 | 0 | 0 | 1 | 0 | 1 |
| 6 | 1 | 0 | 1 | 0 | 0 | 1 | 0 | 1 |
| 7 | 0 | 1 | 1 | 0 | 0 | 1 | 0 | 1 |
| 8 | 1 | 1 | 1 | 0 | 1 | 1 | 0 | 1 |
| 9 | 0 | 0 | 0 | 1 | 0 | 0 | 1 | 1 |
| 10 | 1 | 0 | 0 | 1 | 1 | 0 | 1 | 1 |
| 11 | 0 | 1 | 0 | 1 | 1 | 0 | 1 | 1 |
| 12 | 0 | 0 | 1 | 1 | 1 | 0 | 1 | 1 |
| 13 | 1 | 1 | 0 | 1 | 0 | 1 | 0 | 1 |
| 14 | 1 | 0 | 1 | 1 | 0 | 1 | 1 | 1 |
| 15 | 0 | 1 | 1 | 1 | 0 | 1 | 1 | 1 |
| 16 | 1 | 1 | 1 | 1 | 1 | 1 | 0 | 1 |

In order to produce the results indicated in Table 2, only four logic circuit blocks need be added to the circuit arrangement of FIG. 1. These comprise three logic OR circuit blocks 40, 41 and 42, and a single, three-input logic AND circuit block 43. Furthermore, an additional input terminal 44 and two additional output terminals 45 and 46 are provided. Terminal 44 is connected to be responsive to the input $Z_I$ which is the output $Z_0$ of a preceding cell, terminal 45 is connected to provide the output Y, and terminal 46 is connected to provide the output $Z_0$.

Input terminal 44 is connected to OR circuit 40 and to OR circuit 41. The OR circuit 40 derives a second input from terminal 21, while OR circuit 41 derives a second input from terminal 22. Thus, OR circuit 40 will produce an output signal L if an input signal $\overline{A}$ and/or an input signal $Z_I$ is applied to its input terminals. Similarly, OR circuit 41 will produce an output signal M if an input signal $\overline{B}$ and/or an input signal $Z_I$ is applied to its input terminals. The outputs of OR circuit 40 and of OR circuit 41 are both applied to AND circuit 43. Furthermore, the output of OR circuit 12 is also applied to AND circuit 43. An output signal N is produced by OR circuit 12 if an input signal $\overline{A}$ and/or an input signal $\overline{B}$ is applied to its input terminals. Since AND circuit 43 is of the three input type, it will produce an output signal 0 only when all three signals L, M and N are applied thereto.

The sequence of logical operations performed by OR circuits 40 and 41, and by AND circuit 43 is such that the signal 0 produced by AND circuit 43 is representative of the output $Z_0$. This may be checked for each of the combinations listed in Table 2 in the manner described with reference to the synchronous adder 10 of FIG. 1. Accordingly, the output of AND circuit 43 is connected to terminal 46. A study of Table 2 and of the described logical operations will show that the output signal $Z_0$ does not occur as the complement of the carry signal $C_0$, but rather is produced whenever a carry signal is not progressing through the chain of adder cells.

Given the output $Z_0$, it becomes a simple matter to produce the output Y. As indicated before, the production of a Y output signal is dependent upon the production of either a $Z_0$ output signal or a $C_0$ output signal. Accordingly, both the $Z_0$ and $C_0$ outputs of the adder cell are connected to the inputs of OR circuit 42. This produces an output signal P if a signal $Z_0$ and/or a signal $C_0$ is produced. Signal P is thus representative of the output Y listed in Table 2. The output of OR circuit 42 may, therefore, be connected to terminal 45.

Figure 4:
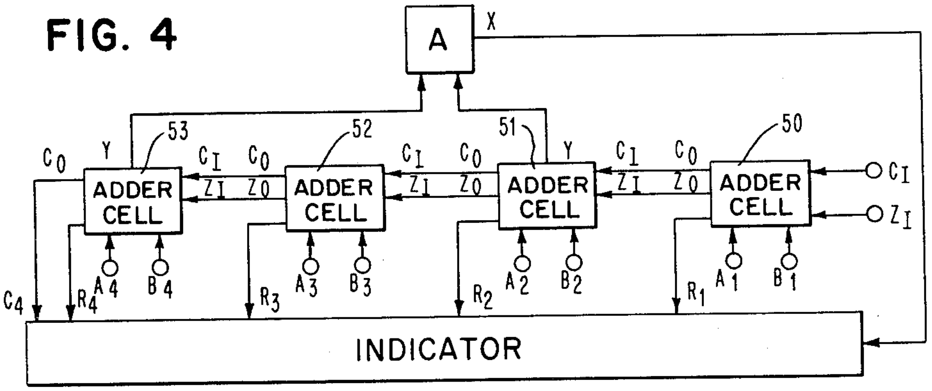
FIG. 4 is a block diagram of an asynchronous computer unit arrangement alternative to that of FIG. 3.

The arrangement of the computer unit of FIG. 3 is only one of a number of possible arrangements which may be employed when asynchronous adder cells of the type shown in FIG. 2 are utilized. For example, an arrangement as illustrated in FIG. 4 might advantageously be employed. This arrangement takes into consideration the hereinbefore described fact that four periods of delay are required in order to produce the R and $C_0$ outputs of each adder cell. On the other hand, only two delay periods are required to produce the output $Z_0$; a first period in OR circuits 40 and 41, and a second period in AND circuit 43. Thus, the requisite information for the production of an X signal may be derived by checking every other cell 51 and 53 in the computer chain for the production of a Y output signal and not each cell as in FIG. 3. This results in the elimination of the OR circuit 42 in every other cell 50 and 52 in the computer chain and, therefore, in a considerable saving in the number of components employed.

Figure 5:
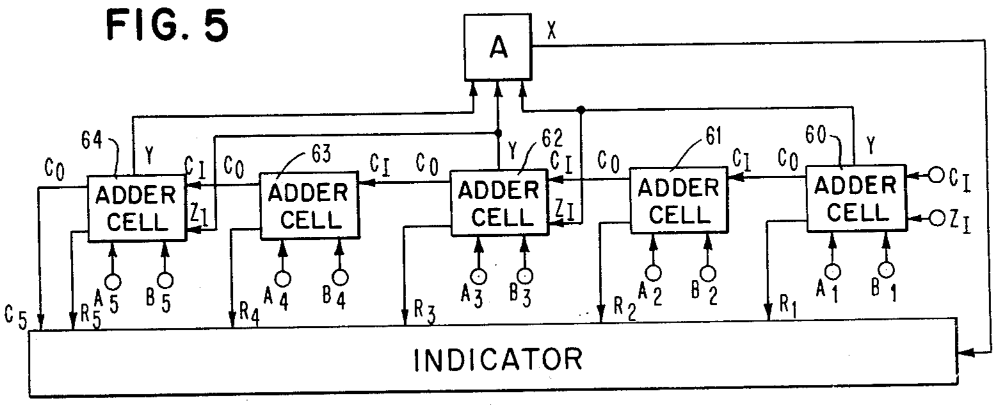
FIG. 5 is a block diagram of another alternative asynchronous computer unit arrangement.

The computer unit of FIG. 5 illustrates still another arrangement whereby a saving in the number of components employed may be effected. In this arrangement, as in the arrangement of FIG. 4, only every other cell 60, 62 and 64 in the computer chain need be checked for the production of a Y signal. Furthermore, the intermediate cells 61 and 63, which are not checked, need not be of the asynchronous type of FIG. 2, but may be, for example, of the synchronous type illustrated in FIG. 1. This is so because the arrangement of FIG. 5 eliminates the need that each adder cell, regardless of whether it is checked or not, produce a $Z_0$ output as in the arrangement of FIG. 4. To this end, the Y output of a preceding asynchronous cell is substituted for the eliminated $Z_0$ output and applied as the $Z_I$ input of a succeeding asynchronous cell. This arrangement effects an even greater saving in the number of components employed, but at a small sacrifice in the speed with which the X signal may be obtained.

It is to be understood that the above described arrangements are simply illustrative of the application of the principles of the invention. Numerous other arrangements may be devised by those skilled in the art which embody the principles of the invention and fall within the spirit and scope thereof.

What is claimed is:

1. A binary full adder cell, comprising a first set of three input terminals for receiving, respectively, input signals representative of an addend, an augend and a previous carry digit, a second set of three input terminals for receiving, respectively, input signals representative of the complement of said addend, augend and previous carry digit, first, second, third, fourth, fifth, sixth and seventh logic OR circuit blocks, each of said OR circuit blocks having two input terminals and a true output terminal, first, second and third logic AND circuit blocks of the two-input type, said first AND circuit having a true output and a complement output, said second AND circuit having a true output, and said third AND circuit having a complement output, a fourth logic AND circuit block of the three-input type, said fourth AND circuit having a true output the addend and augend input terminals being connected to the inputs of said first OR circuit block, the carry digit input terminal being connected to one input of said fourth OR circuit block, the complement addend and complement augend input terminals being connected to the inputs of said second OR circuit block, the complement carry digit input terminal being connected to one input of said third OR circuit block, the outputs of said first and second OR circuit blocks being connected to the inputs of said first AND circuit block, the true output of said first AND circuit block being connected to the other input of said fourth OR circuit block and the complement output of said first AND circuit block being connected to the other input of said third OR circuit block, the outputs of said third and fourth OR circuit blocks being connected to the inputs of said second AND circuit block, the outputs of said second and third OR circuit blocks being connected to the inputs of said third AND circuit block, a resultant output terminal being connected to the output of said second AND circuit block, the complement output of said third AND circuit block being connected to a carry output terminal, another input terminal for receiving an input signal representing that a carry digit is not to be expected, said input terminal being connected to one input of said fifth and sixth OR circuit blocks, the complement addend input terminal being connected to the other input of said fifth OR circuit block, the complement augend input terminal being connected to the other input of said sixth OR circuit block, the outputs of said second, fifth and sixth OR circuit blocks being connected to the inputs of said fourth AND circuit block, and the output of said fourth AND circuit block being connected to one input of said seventh OR circuit block and the complement output of said third AND circuit block being connected to the other input thereof, whereby the output of said seventh OR circuit block is indicative of whether or not the requisite inputs to provide the correct resultant and carry outputs have been applied to the full adder cell.

2. A binary full adder cell, comprising a first set of three input terminals for receiving, respectively, input signals representative of an addend, an augend and a previous carry digit, a second set of three input terminals for receiving, respectively, input signals representative of the complement of said addend, augend and previous carry digit, first, second, third, fourth, fifth and sixth logic OR circuit blocks, each of said OR circuit blocks having two inputs and a true output, first, second and third logic AND circuit blocks of the two-input type, said first AND circuit block having a true output and a complement output, said second AND circuit block having a true output, and said third AND circuit block having a complement output, a fourth logic AND circuit block of the three-input type, said fourth AND circuit block having a true output, the addend and augend input terminals being connected to the inputs of said first OR circuit block, the carry digit input terminal being connected to one input of said fourth OR circuit block, the complement addend and complement augend input terminals being connected to the inputs of said second OR circuit block, the complement carry digit input terminal being connected to one input of said third OR circuit block, the outputs of said first and second OR circuit blocks being connected to the inputs of said first AND circuit block, the true output of said first AND circuit block being connected to the other input of said fourth OR circuit block and the complement output of said first AND circuit block being connected to the other input of said third OR circuit block, the outputs of said third and fourth OR circuit blocks being connected to the inputs of said second AND circuit block, the outputs of said second and third OR circuit blocks being connected to the inputs of said third AND circuit block, a resultant output terminal being connected to the output of said second AND circuit block, the complement output of said third AND circuit block being connected to a carry output terminal, another input terminal for receiving an input signal representing that a carry digit is not to be expected, said input terminal being connected to one input of said fifth and sixth OR circuit blocks, the complement addend input terminal being connected to the other input of said fifth OR circuit block, the complement augend input terminal being connected to the other input of said sixth OR circuit block, the outputs of said second, fifth and sixth OR circuit blocks being connected to the inputs of said fourth AND circuit block whereby the output of said fourth AND circuit block may be utilized to indicate to a succeeding adder cell whether or not a carry digit is to be expected.

3. A computer unit comprising an electrical tandem arrangement of a plurality of full adder cells in accordance with claim 1, and including circuit means for connecting the output of the said fourth AND circuit block of a preceding cell in said tandem arrangement to the said another input terminal of the succeeding cell in said tandem arrangement, and means responsive to the output of the said seventh OR circuit block of at least every other adder cell in said tandem arrangement for signalling whether or not the requisite inputs to provide the correct resultant and carry outputs have been applied to all the adder cells in said tandem arrangement.

4. A computer unit in accordance with claim 3, in which said signalling means comprises a fifth logic AND circuit block having one input for at least every other adder cell in said tandem arrangement.

5. A computer unit in accordance with claim 4, in which said fifth AND circuit block has one input for each adder cell in said tandem arrangement, circuit means being provided to connect the output of the seventh OR circuit block in each said adder cell to a different one of the inputs of said fifth AND circuit block.

6. A computer unit in accordance with claim 3, which further includes means for providing an indication of the resultant outputs of the adder cells in said tandem arrangement, the output of said signalling means being connected to said indicating means to signal the correctness of said indication.

7. A computer unit comprising an electrical tandem arrangement of a plurality of full adder cells, in which arrangement first adder cells alternate with second adder cells; said first adder cells each including a first set of three input terminals for receiving, respectively, input signals representative of an addend, an augend and a previous carry digit, a second set of three input terminals for receiving, respectively, input signals representative of the complement of said addend, augend and previous carry digit, first, second, third, fourth, fifth, sixth and seventh logical OR circuit blocks, each of said OR circuit blocks having two input terminals and a true output terminal, first, second and third logic AND circuit blocks of the two-input type, said first AND circuit having a true output and a complement output, said second AND circuit having a true output, and said third AND circuit having a complement output, a fourth logic AND circuit block of the three-input type, said fourth AND circuit having a true output, the addend and augend input terminals being connected to the inputs of said first OR circuit block, the carry digit input terminal being connected to one input of said fourth OR circuit block, the complement addend and complement augend input terminals being connected to the inputs of said second OR circuit block, the complement carry digit input terminal being connected to one input of said third OR circuit block, the outputs of said first and second OR circuit blocks being connected to the inputs of said first AND circuit block, the true output of said first AND circuit block being connected to the other input of said fourth OR circuit block and the complement output of said first AND circuit block being connected to the other input of said third OR circuit block, the outputs of said third and fourth OR circuit blocks being connected to the inputs of said second AND circuit block, the outputs of said second and third OR circuit blocks being connected to the inputs of said third AND circuit block, a resultant output terminal being connected to the output of said second AND circuit block, the complement output of said third AND circuit block being connected to a carry output terminal, another input terminal for receiving an input signal representating that a carry digit is not to be expected, said input terminal being connected to one input of said fifth and sixth OR circuit blocks, the complement addend input terminal being connected to the other input of said fifth OR circuit block, the complement augend input terminal being connected to the other input of said sixth OR circuit block, the outputs of said second, fifth and sixth OR circuit blocks being connected to the inputs of said fourth AND circuit block, and the output of said fourth AND circuit block being connected to one input of said seventh OR circuit block and the complement output of said third AND circuit block being connected to the other input thereof whereby the output of said seventh OR circuit block is indicative of whether or not the requisite inputs to provide the correct resultant and carry outputs have been applied to the full adder cell; said second adder cells each including a first set of three input terminals for receiving, respectively, input signals representative of an addend, an augend and a previous carry digit, a second set of three input terminals for receiving, respectively, input signals representative of the complement of said addend, augend and previous carry digit, first, second, third, fourth, fifth and sixth logic OR circuit blocks, each of said OR circuit blocks having two inputs and a true output, first, second and third logic AND circuit blocks of the two-input type, said first AND circuit block having a true output and a complement output, said second AND circuit block having a true output, and said third AND circuit block having a complement output, a fourth logic AND circuit block of the three-input type, said fourth AND circuit block having a true output, the addend and augend input terminals being connected to the inputs of said first OR circuit block, the carry digit input terminal being connected to one input of said fourth OR circuit block, the complement addend and complement augend input terminals being connected to the inputs of said second OR circuit block, the complement carry digit input terminal being connected to one input of said third OR circuit block, the outputs of said first and second OR circuit blocks being connected to the inputs of said first AND circuit block, the true output of said first AND circuit block being conected to the other input of said fourth OR circuit block and the complement output of said first AND circuit block being connected to the other input of said third OR circuit block, the outputs of said third and fourth OR circuit blocks being connected to the inputs of said second AND circuit block, the outputs of said second and third OR circuit blocks being connected to the inputs of said third AND circuit block, a resultant output terminal being connected to the output of said second AND circuit block, the complement output of said third AND circuit block being connected to a carry output terminal, another input terminal for receiving an input signal representing that a carry digit is not to be expected, said input terminal being connected to one input of said fifth and sixth OR circuit blocks, the complement addend input terminal being connected to the other input of said fifth OR circuit block, the complement augend input terminal being connected to the other input of said sixth OR circuit block, the outputs of said second, fifth and sixth OR circuit blocks being connected to the inputs of said fourth AND circuit block whereby the output of said fourth AND circuit block may be utilized to indicate to a succeeding adder cell whether or not a carry digit is to be expected; and said electrical tandem arrangement further including circuit means for connecting the output of the said fourth AND circuit block of a preceding cell in said tandem arrangement to the said another input terminal of the succeeding cell in said tandem arrangement, and means responsive to the output of the said seventh OR circuit block of each of said first adder cells for signalling whether or not the requisite inputs to provide the correct resultant and carry outputs have been applied to all the adder cells in said tandem arrangement.

8. A computer unit in accordance with claim 7, in which said signalling means comprises a fifth logic AND circuit block having one input for each of said first adder cells.

9. A computer unit comprising an electrical tandem arrangement of a plurality of full adder cells, in which arrangement every other adder cell includes a first set of three input terminals for receiving, respectively, input signals representative of an addend, an augend and a previous carry digit, a second set of three input terminals for receiving, respectively, input signals representative of the complement of said addend, augend and previous carry digit, first, second, third, fourth, fifth, sixth and seventh logic OR circuit blocks, each of said OR circuit blocks having two input terminals and a true output terminal, first, second and third logic AND circuit blocks of the two-input type, said first AND circuit having a true output and a complement output, said second AND circuit having a true output, and said third AND circuit having a complement output, a fourth logic AND circuit block of the three-input type, said fourth AND circuit having a true output the addend and augend input terminals being connected to the inputs of said first OR circuit block, the carry digit input terminal being connected to one input of said fourth OR circuit block, the complement addend and complement augend input terminals being connected to the inputs of said second OR circuit block, the complement carry digit input terminal being connected to one input of said third OR circuit block, the outputs of said first and second OR circuit blocks being connected to the inputs of said first AND circuit block, the true output of said first AND circuit block being connected to the other input of said fourth OR circuit block and the complement output of said first AND circuit block being connected to the other input of said third OR circuit block, the outputs of said third and fourth OR circuit blocks being connected to the inputs of said second AND circuit block, the outputs of said second and third OR circuit blocks being connected to the inputs of said third AND circuit block, a resultant output terminal being connected to the output of said second AND circuit block, the complement output of said third AND circuit block being connected to a carry output terminal, another input terminal for receiving an input signal representing that a carry digit is not to be expected, said input terminal being connected to one input of said fifth and sixth OR circuit blocks, the complement addend input terminal being connected to the other input of said fifth OR circuit block, the complement augend input terminal being connected to the other input of said sixth OR circuit block, the outputs of said second, fifth and sixth OR circuit blocks being connected to the inputs of said fourth AND circuit block, and the output of said fourth AND circuit block being connected to one input of said seventh OR circuit block and the complement output of said third AND circuit block being connected to the other input thereof, whereby the output of said seventh OR circuit block is indicative of whether or not the requisite inputs to provide the correct resultant and carry outputs have been applied to the full adder cell; said electrical tandem arrangement further including circuit means for connecting the output of the said seventh OR circuit block of a preceding other adder cell to the said another input terminal of the succeeding other adder cell in said tandem arrangement, and means responsive to the output of the seventh OR circuit block of each of said other adder cells for signalling whether or not the requisite inputs to provide the correct resultant and carry outputs have been applied to all the adder cells in said tandem arrangement.

10. A computer unit in accordance with claim 9, in which said signalling means comprises a fifth logic AND circuit block having one input for each of said other adder cells.

11. In combination with a full adder cell for producing resultant and carry outputs from addend, augend and carry inputs, means for adapting said cell for asynchronous operation, comprising first and second input terminals for receiving, respectively, input signals representative of the complements of said addend and of said augend, a third input terminal for receiving an input signal representing that a carry digit is not to be expected, first, second, third, and fourth logic OR circuits blocks of the two input type and a logic AND circuit block of the three-input type, each of said logic circuits having a true output, said first and second input terminals being connected to the inputs of said first OR circuit block, said first and third input terminals being connected to the inputs of said second OR circuit block, said second and third input terminals being connected to the inputs of said third OR circuit block, the outputs of said first, second, and third OR circuit blocks being connected to the inputs of said AND circuit block, and the output of said AND circuit block being connected to one input of said fourth OR circuit block and the carry output of said adder cell being connected to the other input thereof whereby the output of said fourth OR circuit block is indicative of whether or not the requisite inputs to provide the correct resultant and carry outputs have been applied to the said adder cell.

References Cited in the file of this patent

Richards: Arithmetic Operations in Digital Computers, D. Van Nostrand and Co., Inc., Princeton, N.J., March 17, 1955, pgs. 36, 85 and 86 relied on.